United States Patent [19]
Yamanaka

[11] Patent Number: 5,657,210
[45] Date of Patent: Aug. 12, 1997

[54] RADIO PAGER HAVING A PROTECTION LID

[75] Inventor: Toshiki Yamanaka, Shizuoka, Japan

[73] Assignee: NEC Corporation, Japan

[21] Appl. No.: 662,075

[22] Filed: Jun. 12, 1996

[30]  Foreign Application Priority Data

Jun. 13, 1995  [JP]  Japan .................................. 7-146165

[51] Int. Cl.⁶ ..................................................... H04B 1/03
[52] U.S. Cl. ......................... 361/814; 361/759; 361/803; 379/440; 455/90; 455/351; 455/347
[58] Field of Search ..................................... 361/752, 803, 361/755, 759, 801, 810, 747, 732, 683, 679–682, 684, 685; 340/825.44; 455/90, 347, 348, 349, 351, 352; 379/433, 440, 110, 58, 60; 235/146, 145 A; D14/257, 191, 188; 16/112, 114 R, 68, 268

[56]                 References Cited
                U.S. PATENT DOCUMENTS

D. 343,171  1/1994  Taylor ....................................... 379/60
4,845,772  7/1989  Metroka et al. ........................... 379/61
5,221,838  6/1993  Gutman et al. ..................... 340/825.44
5,473,316  12/1995  Takaya .............................. 340/825.44

*Primary Examiner*—Leo P. Picard
*Assistant Examiner*—Anthony Dinkins
*Attorney, Agent, or Firm*—Ostrolenk, Faber, Gerb & Soffen, LLP

[57]                    ABSTRACT

A radio pager has a casing and a cover capable of covering the casing. A hinge structure for connecting the casing and cover has a fulcrum portion included in the casing, and a flexible bearing portion included in the cover and capable of mating with the fulcrum portion. A locking mechanism for locking the cover to the casing has a recess formed in the casing, and a flexible tongue included in the cover and capable of mating with the recess. The cover protects a display portion of the casing from damage and can be easily mounted and dismounted from the casing.

2 Claims, 3 Drawing Sheets

RADIO PAGER HAVING A PROTECTION LID

BACKGROUND OF THE INVENTION

The present invention relates to a radio pager having a protection lid and, more particularly, to a radio pager having a protection plate covering a display on one end wall of its casing.

A radio pager extensively used today has a casing and a display, not shown, built in the casing. A received message or a message for the manipulation of the pager is displayed on the display and seen through one end wall of the casing. A transparent protection plate is adhered to the casing in order to protect the display and is made of acrylic resin or similar material.

However, the conventional radio pager has a problem that the transparent protection plate directly exposed to the outside is easily scratched or damaged on hitting against another object while being carried by the user of the pager. Another problem is that because the protection plate is adhered to the casing, it cannot be easily replaced when scratched or damaged.

SUMMARY OF THE INVENTION

It is therefore an object of the present invention to provide a radio pager having a cover for protecting a display portion of its casing, and in addition allowing the cover to be easily mounted and dismounted from the casing.

A radio pager of the present invention has a casing having on one end wall thereof a transparent protection plate covering a display. A cover covers the one end wall of the casing. A hinge structure connects one edge of the cover to one edge of the one end wall of the casing and allows the cover to rotate about the one edge of the casing. A locking mechanism selectively locks another edge of the casing facing the one edge to another edge of the one end wall of the casing facing the one edge. The hinge structure has a fulcrum portion included in the casing, and a flexible bearing portion included in the cover and engageable with the fulcrum portion. The locking mechanism has a recess formed in the casing, and a tongue extending out from the cover and engageable with the recess.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
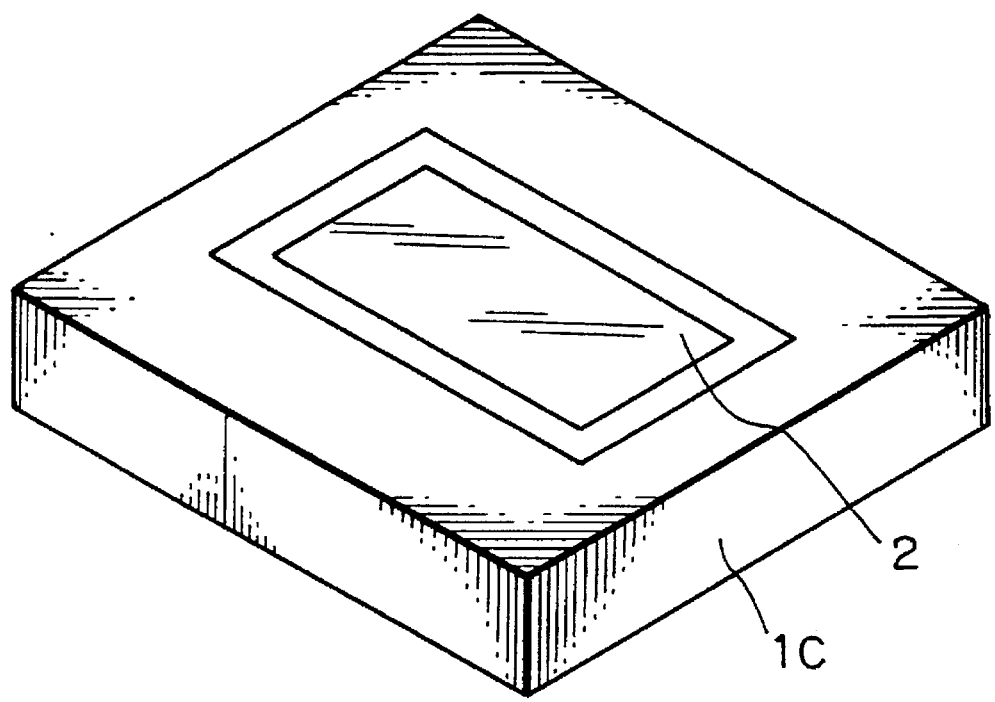
FIG. 1 is a perspective view showing the external appearance of a conventional radio pager.

To better understand the present invention, a brief reference will be made to a conventional radio pager, shown in FIG. 1. As shown, the radio pager has a casing 1C and a display, not shown, built in the casing 1C. A received message or a message for the manipulation of the pager is displayed on the display and seen through one end wall of the casing 1C. A transparent protection plate 2 is adhered to the casing 1C in order to protect the display and is formed of acrylic resin or similar material. This kind of configuration has some problems left unsolved, as discussed earlier.

Figure 2A:
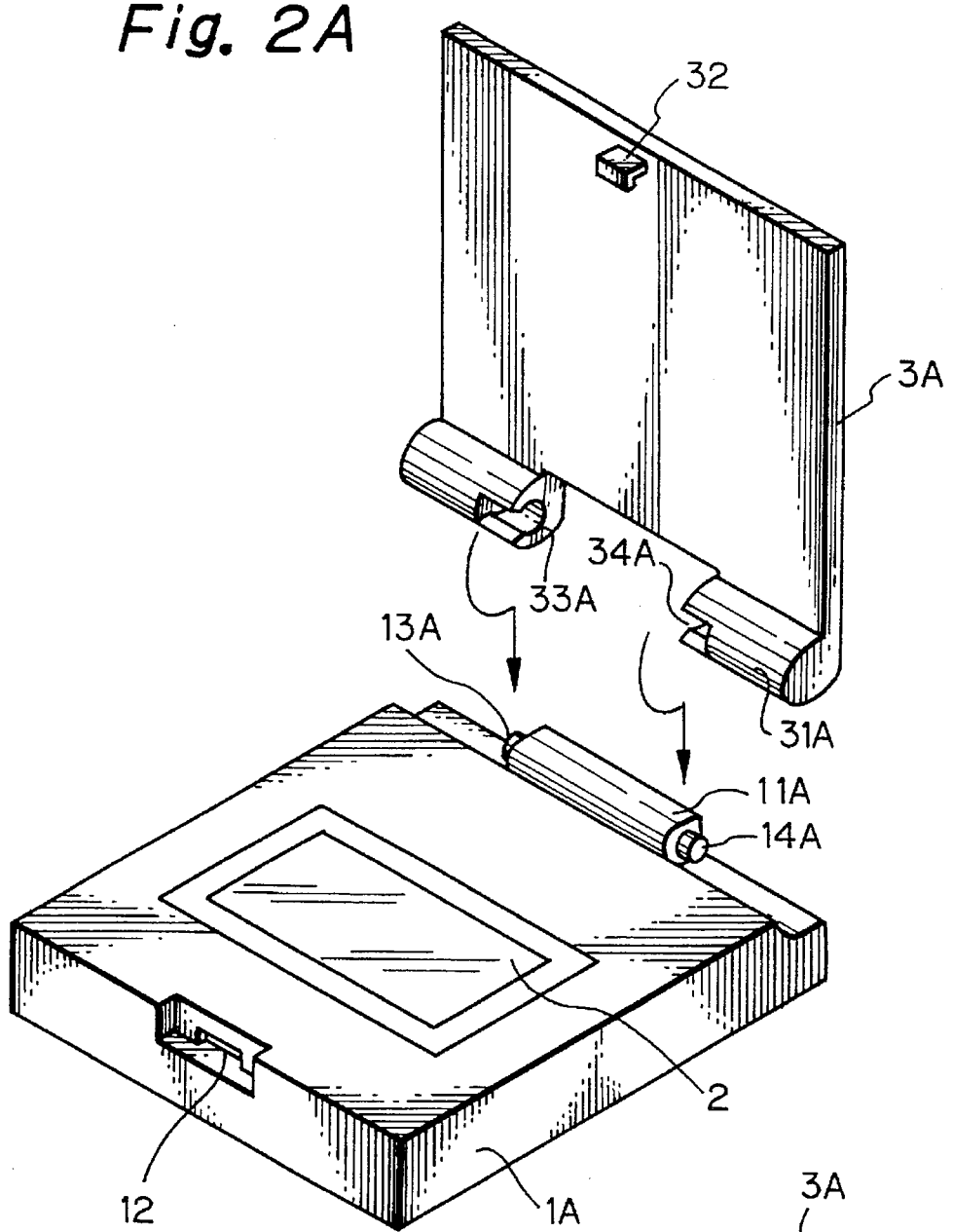
FIG. 2A is an exploded perspective view showing a radio pager embodying the present invention.
Figure 2B:
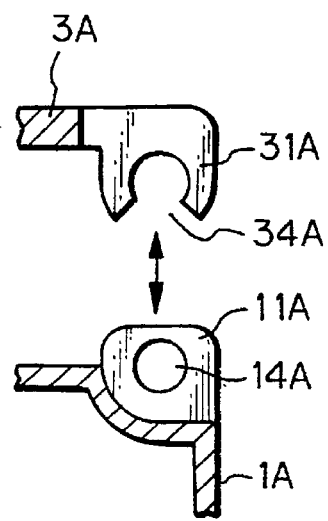
FIG. 2B is a section showing a hinge structure included in the embodiment.

Referring to FIGS. 2A and 2B, a radio pager embodying the present invention is shown. As shown in FIG. 2A, the radio pager includes a casing 1A having various functions for paging arranged in the inside and on the surface thereof. A display, not shown, is built in the casing 1A. A received message or a message for manipulation appears on the display and is visible through one end wall of the casing 1A. A transparent protection plate 2 is adhered to the casing 1A in order to protect the display and is made of acrylic resin or similar resin. A cover 3A is removably mounted to the casing 1A in order to conceal the end wall of the casing 1A where the protection plate 2 is located, thereby protecting the plate 2. The casing 1A is formed of polycarbonate or similar resin while the cover 3A is formed of polycarbonate/ABS alloy or similar flexible material.

Specifically, the cover 3A is connected to one edge of the end wall of the casing 1A where the protection plate 2 is located. The cover 3A is rotatable about the above edge of the casing 1A via a hinge structure which will be described. When the cover 3A is shut onto the casing 1A, its other edge remote from the hinge structure is locked to the other edge of the casing 1A by a locking mechanism which will also be described.

The hinge structure has a fulcrum portion 11A positioned on the edge of the casing 1A to which the cover 3A is connected, and a bearing portion 31A included in the cover 3A for mating with the fulcrum portion 11A. Specifically, the fulcrum portion 11A is formed with cylindrical projections or fulcrums 13A and 14A at opposite ends thereof. The flexible bearing portion 31A of the cover 3A are formed with notches 33A and 34A. The fulcrums 13A and 14A are received in the bearing portion 31A through the notches 33A and 34A. As shown in FIG. 2B, the notches 33A and 34A are formed integrally with the cover 3A. This configuration allows the bearing portion 31A to be easily engaged with the fulcrums 13A and 14A and disengaged therefrom due to the flexibility of the cover 3A.

The locking mechanism for locking the cover 3A to the casing 1A consists of a recess 12 formed in the other edge of the above end wall of the casing 1A, and a tongue 32 protruding from the other edge of the cover 3A and formed of the same material as the cover 3A. When the cover 3A is shut onto the casing 1A, the flexible tongue 32 is slightly urged outward by the casing 1A and then snapped into the recess 12. As a result, the cover 3A is locked to the casing 1A. Because the tongue 32 is flexible, it can also be easily pulled out of the recess 12 when the cover 3A is to be opened away from the casing 1A.

As stated above, the illustrative embodiment allows the user to mount and dismount the cover 3A from the casing 1A with ease. When the cover 3A is mounted to the casing 1A and shut, it covers the transparent protection plate 2 and thereby prevents it from contacting or hitting against an object which is apt to damage it. On the other hand, when the cover 3A is removed from the casing 1A, the pager has its size and weight reduced. This enhances the portability of the pager although degrading the protection of the transparent plate 2.

A plurality of replaceable covers 3A different in color and design may be prepared. Then, the embodiment implements a wide variety of radio pagers different in color and design.

Figure 3:
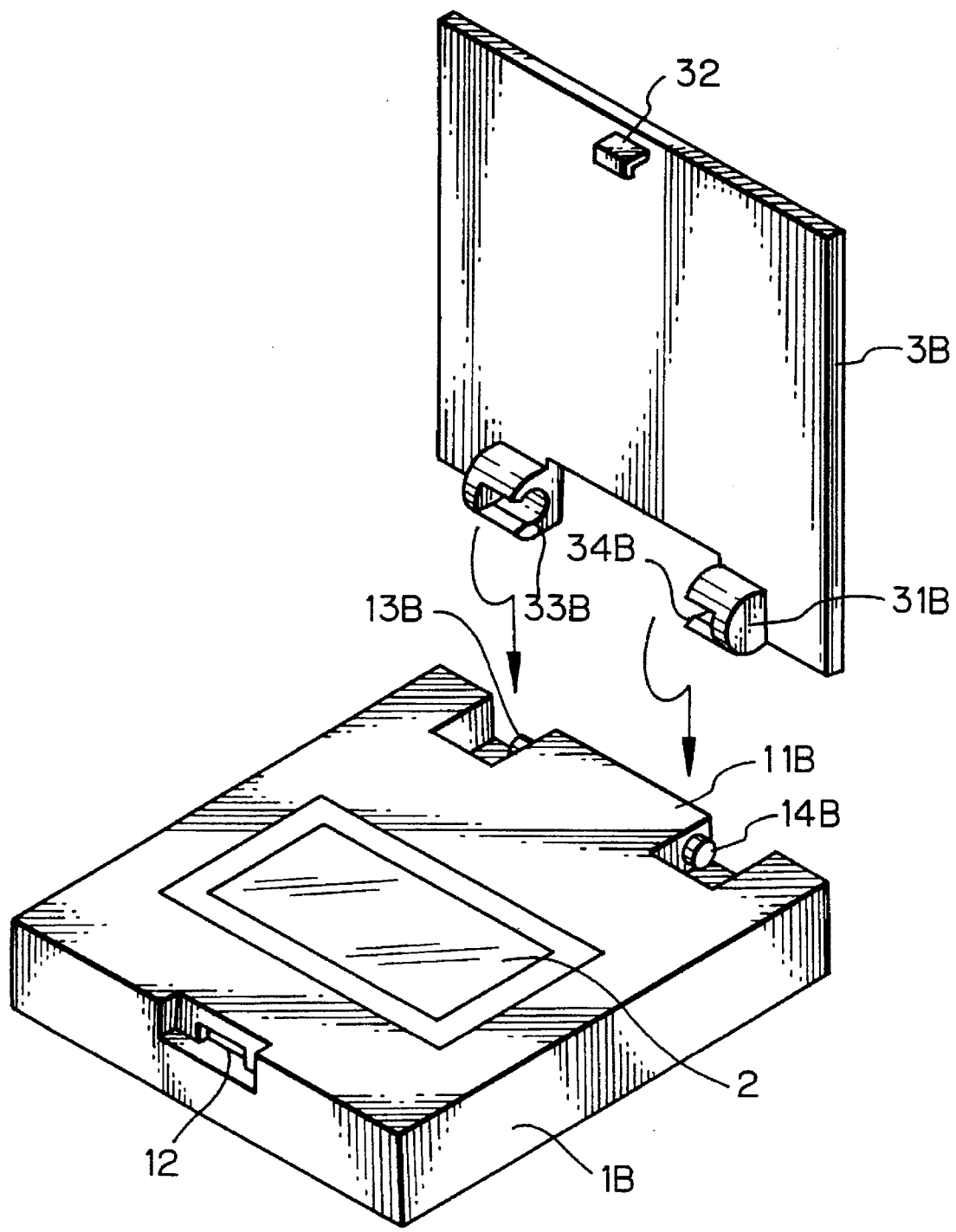
FIG. 3 is an exploded perspective view showing an alternative embodiment of the present invention.

Referring to FIG. 3, an alternative embodiment of the present invention will be described. This embodiment is essentially similar to the previous embodiment except for the hinge structure. As shown, a casing 1B has a fulcrum portion 11B and fulcrums 13B and 14B different from the fulcrum portion 11A and fulcrums 13A and 14A of the casing 1A. A cover 3B is similar to the cover 3A except for its flexible bearings portion 31B and notches 33B and 34B. This embodiment also has the locking portion implemented by the recess 12 and tongue 32.

The hinge structure of this embodiment is arranged as follows. The fulcrum portion 11B is located at one edge of the end wall of the casing 1B where the protection plate 2 is mounted. The flexible bearing portion 31B included in the cover 3B is engageable with the fulcrum portion 11B. The fulcrum portion 11B is positioned inward of the outermost contour line of the casing 11B, i.e., it does not protrude from the above line at all. Specifically, the edge portion of the casing 1B for mounting the cover 3B is notched inward from the outermost contour line of the casing 1B, as illustrated. The cylindrical fulcrum portions 13B and 14B are formed in such an edge portion of the casing 1B. The flexible bearing portion 31B of the cover 3B is formed with the notches 33B and 34B for receiving the fulcrums 13B and 14B. Because the notches 33B and 34B are formed integrally with the cover 3B, the bearing portion 31A can be easily engaged with the fulcrums 13A and 14A and disengaged therefrom due to the flexibility of the cover 3A.

This embodiment has the following advantage in addition to the advantages of the previous embodiment. When the cover 3B is removed from the casing 1B, nothing protrudes from the hinge portion beyond the outermost contour line of the casing 1B. Therefore, when the pager is put in, e.g., the user's pocket, it is least probable that the pager is caught by the edge of the pocket.

In summary, in accordance with the present invention, a radio pager has a casing and a cover capable of covering the casing. A hinge structure for connecting the casing and cover has a fulcrum portion included in the casing, and a flexible bearing portion included in the cover and capable of mating with the fulcrum portion. A locking mechanism for locking the cover to the casing has a recess formed in the casing, and a flexible tongue included in the cover and capable of mating with the recess. The cover can therefore be easily mounted and dismounted from the casing. When the cover is mounted to the casing, a transparent protection plate affixed to the casing is concealed by the cover and protected from damage thereby. When the cover is removed from the casing, the pager has its size and weight reduced and is easier to carry.

Various modifications will become possible for those skilled in the art after receiving the teachings of the present disclosure without departing from the scope thereof.

What is claimed is:

1. A radio pager comprising:

a casing having on one end wall thereof a transparent protection plate covering a display;

a cover for covering said one end wall of said casing;

a hinge structure for connecting one edge of said cover to one edge of said one end wall of said casing and allowing said cover to rotate about said one edge of said casing; and a locking mechanism for selectively locking another edge of said casing facing said one edge to another edge of said one end wall of said casing facing said one edge;

said hinge structure comprising a fulcrum portion included in said casing, and a flexible bearing portion included in said cover and engageable with said fulcrum portion;

said locking mechanism comprising a recess formed in said casing, and a tongue extending out from said cover and engageable with said recess.

2. A radio pager as claimed in claim 1, wherein said fulcrum portion is positioned inward of an outermost contour line of said casing.

* * * * *